United States Patent [19]

Walsh et al.

[11] Patent Number: 4,808,363
[45] Date of Patent: Feb. 28, 1989

[54] COMPOSITE WEB DECURLING APPARATUS AND METHOD

[75] Inventors: Joseph C. Walsh, Longmont; James W. Jensen, Boulder, both of Colo.

[73] Assignee: Adolph Coors Company, Golden, Colo.

[21] Appl. No.: 93,808

[22] Filed: Sep. 4, 1987

[51] Int. Cl.[4] .................. B29C 55/02; B29C 53/18; B29C 61/00; B29C 61/02

[52] U.S. Cl. .................. 264/288.4; 264/230; 264/284; 264/289.6; 264/DIG. 71; 425/112; 425/DIG. 53

[58] Field of Search .............. 264/288.4, 289.6, 230, 264/DIG. 71, 284; 425/112, DIG.53

[56] References Cited

U.S. PATENT DOCUMENTS 4,254,173  3/1981  Peer, Jr. ........................ 428/204
4,572,752  2/1986  Jensen et al. .................... 156/64

Primary Examiner—Philip Anderson
Attorney, Agent, or Firm—Klaas & Law

[57] ABSTRACT

An apparatus for treating a moving web of laminated composite material of the type having a relatively thin film layer adhered to a relatively thick paper layer for eliminating the tendency of the web to curl toward the film layer side thereof subsequent to being stored on a spool with the film layer of the web positioned inwardly of the paper layer of the web, the film layer and paper layer each having an exposed surface and an attached surface, the attached surfaces of the layers being adhered together, the paper layer having an outwardly positioned thickness portion which terminates at the exposed surface thereof, an inwardly positioned thickness portion which terminates at the attached surface thereof and an intermediately positioned thickness portion positioned between the outwardly positioned thickness portion and the inwardly positioned thickness portion, the outwardly positioned thickness portion being relatively stretched, the inwardly positioned thickness portion being relatively shrunk, the intermediately positioned thickness portion being relatively unstretched and unshrunk, the film layer being relatively shrunk through storage of the composite web on the spool, comprising: composite web supply means, film heating means, paper heating means; the stretching occurring in the inwardly positioned portion of the paper and in the film layer and the shrinking occurring in the outwardly positioned portion of the paper layer being of an amount whereby oppositely positioned portions of the film layer and the paper layer of the web are of substantially equal length in an unstressed state subsequent to treatment by the apparatus whereby the tendency of the composite web to curl toward the film layer side is eliminated.

9 Claims, 1 Drawing Sheet

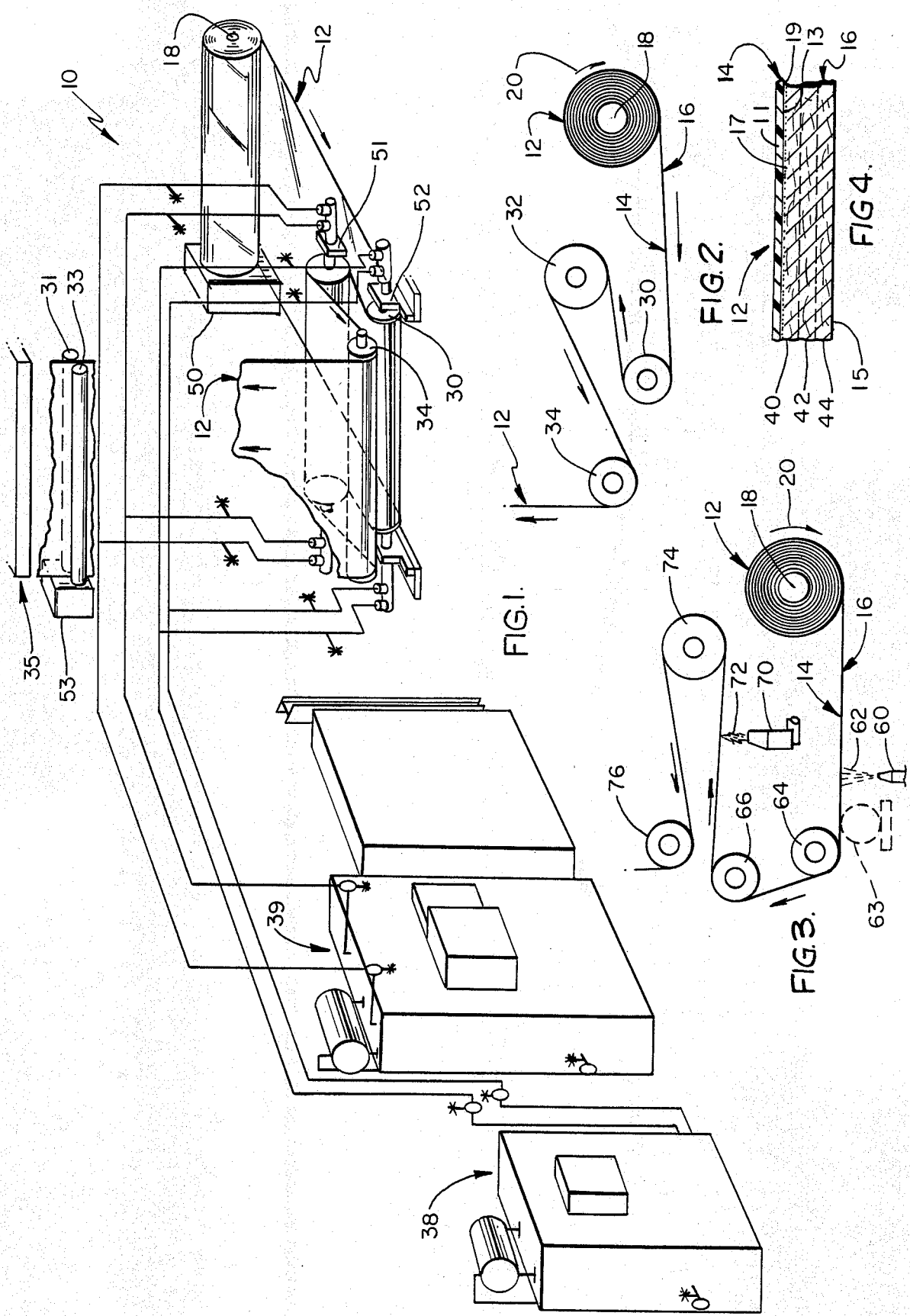

COMPOSITE WEB DECURLING APPARATUS AND METHOD

BACKGROUND OF THE INVENTION

The present invention relates generally to web handling and processing equipment and, more particularly, to an apparatus for decurling laminated composite webs.

Laminated composite webs having a relatively thin film layer adhered to a relatively thick paper layer and laminators for forming such webs are described in U.S. Pat. No. 4,254,173 of Peer and U.S. Pat. No. 4,572,752 of Jensen et al., which are both hereby specifically incorporated by reference for all that is disclosed therein. A laminated composite web such as described in the above patents is wound on a takeup spool after emerging from a production laminator. The direction of winding of the spool is usually such that the film layer of the composite web is positioned inwardly of the paper layer. The laminated composite web is stored in this spool form. Due to the fact that the film portion of the composite is ordinarily still warm and readily deformable after emerging from the laminator, the film portion of the composite "takes a set" while it is positioned on the windup spool such that the film layer is slightly shrunk with respect to the exposed portion of the paper layer due to its more radially inward location on the spool. The paper layer of the web, which is much thicker than the film layer, takes a differential type of set with the thickness portion of the paper web positioned adjacent the film web being slightly shrunk relative the thickness portion of the paper web that is positioned most remotely from the film web. As a result, a length of composite, upon being unwound from the spool, tends to curl up with the film side of the composite positioned on the inside of the curl. Curling of the composite web in this manner causes problems with other operations subsequently performed on the composite web such as die cutting. As a result, it is desirable to decurl the composite web before preforming these further operations.

It is known in the paper-treating arts that paper will shorten each time it goes through a cycle of having moisture applied to it and then removed from it, i.e. after the completion of such a cycle the paper will be shorter than its previous length even when the paper moisture content after the cycle is returned to the original value. This phenomenon is known in the art as "moisture hysteresis". In prior art paper web decurling units used on pure paper webs, a decurling roll which has a surface that transports moisture to the surface of the paper web passing thereover is used to add moisture to one side (the long side) of a curled paper web. During subsequent air drying of the paper web, the paper on the side to which moisture was applied is relative shrunk, while the other side of the paper web remains of a relatively constant length.

BRIEF DESCRIPTION OF THE DRAWING

An illustrative and presently preferred embodiment of the invention is shown in the accompanying drawing in which:

FIG. 1 is a partially cut-away perspective view of a composite web decurling apparatus.

FIG. 2 is a schematic side elevation view of a composite web decurling apparatus.

FIG. 3 is a schematic side elevation view of another embodiment of a composite web decurling apparatus.

FIG. 4 is a detail side elevation view of a length of composite web.

SUMMARY OF THE INVENTION

The present invention may comprise an apparatus for treating a moving web of laminated composite material of the type having a relatively thin film layer adhered to a relatively thick paper layer for eliminating the tendency of the web to curl toward the film layer side thereof subsequent to being stored on a spool with the film layer of the web positioned inwardly of the paper layer of the web, the film layer and paper layer each having an exposed surface and an attached surface said attached surfaces of said layers being adhered together, said paper layer having an outwardly positioned thickness portion which terminates at said exposed surface thereof, an inwardly positioned thickness portion which terminates at said attached surface thereof and an intermediately positioned thickness portion positioned between said outwardly positioned thickness portion and said inwardly positioned thickness portion, said outwardly positioned thickness portion being relatively stretched, said inwardly positioned thickness portion being relatively shrunk, said intermediately positioned thickness portion being relatively unstretched and unshrunk, said film layer being relatively shrunk through storage of the composite web on the spool, comprising: (a) composite web supply means for supplying the moving web of composite material to be treated; (b) film heating means for heating said film layer portion of said composite web to a temperature sufficient to place said plastic film layer in a readily deformable, substantially nonelastic state for a relatively short period whereby relative stretching deformation occurring in said film layer caused by stretching forces applied thereto during said nonelastic state thereof is not accompanied by shrinking of said film layer subsequent to removal of said stretching forces, the amount of film portion stretching occurring during said nonelastic state being limited to the amount of relative stretching occurring in said relatively inwardly positioned portion of said paperboard portion of said web; (c) paper heating means for heating said exposed surface of said paper layer for causing a relative drying in said relatively outwardly positioned portion of said paper layer for causing relative shrinking of said outwardly positioned portion of said paper layer and for causing relative hydrating of said inwardly positioned portion of said paper layer for causing relative stretching of said inwardly positioned portion; the stretching occurring in said inwardly positioned portion of said paper and in said film layer and the shrinking occurring in said outwardly positioned portion of said paper layer being of an amount whereby oppositely positioned portions of said film layer and said paper layer of said web are of substantially equal length in an unstressed state subsequent to treatment by said apparatus whereby the tendency of the composite web to curl toward said film layer side is eliminated.

The present invention may also comprise a method of eliminating the curl from a laminated composite web of the type having a relatively thin film layer adhered to a relatively thick paper layer for eliminating the tendency of the web to curl toward the film layer side thereof subsequent to being stored on a spool with the film layer of the web positioned inwardly of the paper layer of the web, the film layer and paper layer each having an exposed surface and an attached surface said attached surfaces of said layers being adhered together, said paper layer having an outwardly positioned thickness portion which terminates at said exposed surface thereof, an inwardly positioned thickness portion which terminates at said attached surface thereof and an intermediately positioned thickness portion positioned between said outwardly positioned thickness portion and said inwardly positioned thickness portion, said outwardly positioned thickness portion being relatively stretched, said inwardly positioned thickness portion being relatively shrunk, said intermediately positioned thickness portion being relatively unstretched and unshrunk, said film layer being relatively shrunk through storage of the composite web on the spool, comprising the steps of: (a) drawing the web from an unwind spool at a relatively constant rate; (b) at a first station positioned downstream of said unwind spool, heating the film side of the web to a temperature whereat the web becomes nonelastically deformable; (c) at a second station positioned immediately downstream of said first station, applying heat to the exposed surface of the paper layer sufficient to cause relative shrinking of the outer thickness portion thereof and relative stretching of the inner thickness portion thereof whereby the tendency of the web to curl inwardly is eliminated.

DETAILED DESCRIPTION OF THE INVENTION

The composite web decurling apparatus 10 of the present invention processes a composite web 12 having a film layer 14 and a paper (board) layer 16 which is dispensed from an unwind spool 18 which rotates in direction 20. As shown in FIG. 4, the film layer has an exposed surface 11 and an attached surface 13. The paper layer has an exposed surface 15 and an attached surface 17. Attached surfaces 13 and 17 are adhered together by a thin adhesive layer 19. The apparatus 10 includes a film engaging and heating roll 30 over which the composite web 12 is initially wound with the film side 14 contacting the roll 30; a paper engaging and heating roll 32 which engages the paper side 16 of the web 12 subsequent to its passage over the film roll 30; and an idler roll 34 around which the web passes prior to its entering a cutter/creaser assembly 35 or other web processing assembly which includes pull rolls such as driven pinch rolls 31, 33. In the embodiment shown in the drawing, the heating rolls 30, 32 are each hot oil heating rolls which are heated by the passage of hot oil through an interior peripheral passageway therein. The hot oil is supplied and circulated through separate hot oil heating and pumping assemblies 38, 39 which maintain the temperature of each roll at a selected preset temperature. Hot oil heating rolls and other heating rolls such as electrically heated rolls are well known in the art. The unwind spool 18, heating rolls 30, 32 and drawing rolls 31, 33 are preferably driven by drive units which are preferably separate direct current motors 50, 51, 54 which are conventionally controlled to drive the spool and all of the rolls at substantially the same surface speed. The temperature of the film web heating roll 30, the circumferential size of the roll 30, and the web speed are selected so as to heat the film portion of the web 14 to a predetermined temperature at which the film becomes nonelastic and readily deformable. In one embodiment used with polyethylene film which is about 2 mils thick, the temperature of a 9.75 inch diameter film heating roll is maintained at about 220° F. at a line speed of about 600 feet per minute in order to raise the temperature of the film to about 150° F. This elevated temperature of the film portion of the web allows the film to remain soft and nonelastic for a short period enabling the film layer to permanently elongate to a length which conforms with the subsequently deformed paper side of the web to remove the curl from the web.

The paper 16 portion of the web, as shown in blown-up cross section in FIG. 4, must also be deformed to remove the curl from the composite web. For purposes of explanation, the paper web portion 16 has its thickness divided into a first zone 40 positioned adjacent the film web, an intermediate zone 42, and a remote zone 44 terminating at exposed surface 15. Each of the zones is about ⅓ the thickness of the web, e.g. 0.010 inches thick for a 0.030 thick paper web. Inwardly positioned zone 40 is relatively elongated, the intermediate zone 42 remains relatively unchanged, and the outwardly positioned zone 44 is relatively shrunk during decurling of the composite web 12.

The paper heating roll 32, by transferring heat to the paper layer 16 through exposed surface 15, causes the moisture content in layer 44 to be relatively reduced, with the moisture content of layer 42 remaining more or less unchanged, and with the moisture content of layer 40 increasing, i.e. heating drives moisture from zone 40 to zone 44. Heating of the web as described with the associated moisture transfer between zones in combination with the wrapping of the web about roll 32 with the film layer positioned outwardly produces the desired shrinking in zone 44 and lengthening in zone 40 of the paper web 16. The lengthening of zone 40 causes lengthening of the attached film portion 14 due to the nonelastic, readily deformable state in which the film layer has been temporarily placed by heating with roll 30. Thus, a composite web with reduced curl or no curl is produced. The exact temperature and duration of contact of the paper web with the paper heating roll will vary depending upon the initial moisture content of the paperboard and the relative humidity in the local environment.

In another embodiment of the invention illustrated in FIG. 3, a composite web 12 having a film layer 14 and a paper layer 16 and identical in construction to that shown in FIG. 4 is drawn from a spool 18 and past a wetting station 60 where a controlled amount of water 62 is applied to exposed surface 15 of the paper layer causing a relative increase in the moisture content of outer zone 44. Alternately, a wetting roll 63 may be used for this purpose. The web next passes over idler rolls 64, 66 and then over flame treater 70 which applies a flame 72 to exposed film surface 17 thereby providing a surface treatment to the film for improving its surface treatment characteristics, as is known in the art, and also heating the film layer sufficiently to place it in a readily deformable nonelastic state for a short period of time. While the film layer is still in the readily deformable nonelastic state the associated paper layer portion of the web is engaged by heating roll 74 and then idler roll 76, etc. Heating roll 74, like previously discussed heating roll 32, drives moisture from zone 44 to zone 40 causing relative shrinking in zone 44 and relative stretching in zone 40. However, due to the increased amount of moisture initially present in zone 40 caused by application of water by wetting unit 60, the relative amounts of stretching and shrinking are increased. The amount of wetting and the amount of heating of the paper layer may be accurately controlled through the use of conventional moisture sensing devices to accommodate differing amounts of web curl and/or different environmental conditions.

The above-described apparatuses or only the portions thereof containing a film layer heating portion may be used to prevent breaking or cracking of the film layer in a subsequent embossing/debossing process used in package material preparation. Using this well-known prior art process, a portion of the composite material which will layer become a carton flap is either raised (embossed) or lowered (debossed) relative to the remaining surface, either on the film side or paper side of the composite. An embossed region of one flap is placed in abutting relationship with a debossed region of a second flap to which it is sealed in a subsequent carton forming operation. The embossing/debossing of the flaps provides a relatively planar and continuous surface in the region where the two flaps are joined. The embossing/debossing process is generally implemented on a "cutter/creaser" device which also cuts the web into carton blanks. Passing the film side of the web over a film heating assembly such as the above-described heating roll or flame treater causes the film layer to remain sufficiently pliable during an immediately following embossing/debossing operation to prevent the film layer from breaking or cracking.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of eliminating the curl from a laminated composite web of the type having a relatively thin film layer adhered to a relatively thick paper layer for eliminating the tendency of the web to curl toward the film layer side thereof subsequent to being stored on a spool with the film layer of the web positioned inwardly of the paper layer of the web, the film layer and paper layer each having an exposed surface and an attached surface said attached surfaces of said layers being adhered together, said paper layer having an outwardly positioned thickness portion which terminates at said exposed surface thereof, an inwardly positioned thickness portion which terminates at said attached surface thereof and an intermediately positioned thickness portion positioned between said outwardly positioned thickness portion and said inwardly positioned thickness portion, said outwardly positioned thickness portion being relatively stretched, said inwardly positioned thickness portion being relatively shrunk, said intermediately positioned thickness portion being relatively unstretched and unshrunk, said film layer being relatively shrunk through storage of the composite web on the spool, comprising the steps of:
    (a) drawing the web from an unwind spool at a relatively constant rate;
    (b) at a first station positioned downstream of said unwind spool, heating the film side of the web to a temperature whereat the web becomes nonelastically deformable;
    (c) at a second station positioned immediately downstream of said first station, applying heat to the exposed surface of the paper layer sufficient to cause relative shrinking of the outer thickness portion thereof and relative stretching of the inner thickness portion thereof whereby the tendency of the web to curl inwardly is eliminated.

2. A method of preventing cracking and breaking of the film layer of a composite web of the type having a relatively thin film layer adhered to a relatively thick paper layer comprising the step of:
    heating the film layer immediately prior to the embossing/debossing process.

3. An apparatus for treating a moving web of laminated composite material of the type having a relatively thin film layer adhered to a relatively thick paper layer for eliminating the tendency of the web to curl toward the film layer side thereof subsequent to being stored on a spool with the film layer of the web positioned inwardly of the paper layer of the web, the film layer and paper layer each having an exposed surface and an attached surface said attached surfaces of said layers being adhered together, said paper layer having an outwardly positioned thickness portion which terminates at said exposed surface thereof, an inwardly positioned thickness portion which terminates at said attached surface thereof and an intermediately positioned thickness portion positioned between said outwardly positioned thickness portion and said inwardly positioned thickness portion, said outwardly positioned thickness portion being relatively stretched, said inwardly positioned thickness portion being relatively shrunk, said intermediately positioned thickness portion being relatively unstretched and unshrunk, said film layer being relatively shrunk through storage of the composite web on the spool, comprising:
    (a) composite web supply means for supplying the moving web of composite material to be treated;
    (b) composite web film heating means for heating said film layer portion of said composite web to a temperature sufficient to place said film layer in a readily deformable, substantially nonelastic state for a relatively short period whereby relative stretching deformation occurring in said film layer caused by stretching forces applied thereto during said nonelastic state thereof is not accompanied by shrinking of said film layer subsequent to removal of said stretching forces, the amount of film layer stretching occurring during said nonelastic state being limited to the amount of relative stretching occurring in said relatively inwardly positioned portion of said paper layer of said web;
    (c) composite web paper heating means for heating said exposed surface of said paper layer for causing a relative drying in said relatively outwardly positioned portion of said paper layer for causing relative shrinking of said outwardly positioned portion of said paper layer and for causing relative hydrating of said inwardly positioned portion of said paper layer for causing relative stretching of said inwardly positioned portion; the stretching occurring in said inwardly positioned portion of said paper layer and in said film layer and the shrinking occurring in said outwardly positioned portion of said paper layer being of an amount whereby oppositely positioned portions of said film layer and said paper layer of said web are of substantially equal length in an unstressed state subsequent to treatment by said apparatus whereby the tendency of the composite web to curl toward said film layer side is eliminated.

4. The invention of claim 3 further comprising web draw means for pulling said web in a downsteam direction for advancing said web through said apparatus and for applying longitudinal tension to said web for controlling said stretching of said film layer and said inwardly positioned portion of said paper layer.

5. The invention of claim 3 wherein said film heating means comprises film heating roll means for rollingly, heatingly engaging said exposed surface of said film layer.

6. The invention of claim 5 wherein said paper heating means comprises paper heating roll means for rollingly, heatingly engaging said exposed surface of said paper layer.

7. The invention of claim 5 wherein said paper heating means comprises flame heating means for directing a flame onto said exposed surface of said paper layer.

8. The invention of claim 7 further comprising wetting means for wetting said exposed surface of said paper layer prior to heating thereof for relatively increasing the amount of shrinking and stretching occurring in said outwardly positioned thickness portion and said inwardly positioned thickness portion respectively.

9. The invention of claim 6 wherein said heating roll means are independently driven heating roll means.

* * * * *